(12) United States Patent
Alam et al.

(10) Patent No.: US 12,299,182 B2
(45) Date of Patent: May 13, 2025

(54) CRYPTOGRAPHIC MRAM AND METHODS THEREOF

(71) Applicant: Everspin Technologies, Inc., Chandler, AZ (US)

(72) Inventors: Syed M. Alam, Austin, TX (US); Sanjeev Aggarwal, Scottsdale, AZ (US)

(73) Assignee: Everspin Technologies, Inc., Chandler, AZ (US)

( * ) Notice: Subject to any disclaimer, the term of this patent is extended or adjusted under 35 U.S.C. 154(b) by 337 days.

(21) Appl. No.: 17/660,253

(22) Filed: Apr. 22, 2022

(65) Prior Publication Data

US 2022/0343030 A1 Oct. 27, 2022

Related U.S. Application Data

(60) Provisional application No. 63/179,681, filed on Apr. 26, 2021.

(51) Int. Cl.
| | | |
|---|---|---|
| *G06F 21/00* | (2013.01) | |
| *G06F 21/72* | (2013.01) | |
| *G06F 21/86* | (2013.01) | |
| *G11C 11/16* | (2006.01) | |
| *H01F 10/32* | (2006.01) | |

(52) U.S. Cl.
CPC ............. *G06F 21/72* (2013.01); *G06F 21/86* (2013.01); *G11C 11/1673* (2013.01); *G11C 11/1675* (2013.01); *H01F 10/3254* (2013.01)

(58) Field of Classification Search
CPC ..... G06F 21/72; G06F 21/86; G11C 11/1675; G11C 11/1673; H01F 10/3254; H04L 9/0866; G09C 1/00
See application file for complete search history.

(56) References Cited

U.S. PATENT DOCUMENTS

| | | | |
|---|---|---|---|
| 9,135,970 B2 | 9/2015 | Subramanian et al. | |
| 9,218,509 B2 | 12/2015 | Alam et al. | |
| 2013/0073598 A1* | 3/2013 | Jacobson | G06F 5/01 |
| | | | 708/250 |
| 2013/0250663 A1* | 9/2013 | Katti | H10B 61/22 |
| | | | 365/158 |
| 2019/0347074 A1 | 11/2019 | Choi | |

OTHER PUBLICATIONS

Extended European search report in European Application No. 22169783.2, dated Sep. 19, 2022. (9 pages).

* cited by examiner

*Primary Examiner* — Tri M Tran
(74) *Attorney, Agent, or Firm* — Bookoff McAndrews, PLLC

(57) ABSTRACT

The present disclosure is drawn to, among other things, a storage device. The storage device may include a magnetic tunnel junction (MTJ)-based storage array and a communication interface. The MTJ-based storage array may be configured to be damaged by a shorting voltage based on detection of a tamper event.

14 Claims, 4 Drawing Sheets

CRYPTOGRAPHIC MRAM AND METHODS THEREOF

CROSS-REFERENCE TO RELATED APPLICATION

This application claims benefit to U.S. Provisional Patent Application No. 63/179,681, filed Apr. 26, 2021, the entire content of which is incorporated herein by reference.

TECHNICAL FIELD

Embodiments of the present disclosure relate to, among other things, magnetoresistive random access memory (MRAM) devices. More specifically, certain embodiments of the present disclosure relate to cryptographic MRAM devices.

INTRODUCTION

MRAM devices may be used to generate and/or store random numbers, e.g., to be used as cryptographic keys. In the event of tamper detection, access to the stored numbers may be prevented by conventional techniques, such as changing any bias voltage for read or write, using disable address or command decoder for disabling memory operations, and/or the like. However, conventional techniques that do not destroy memory contents and memory storage elements may not be sufficiently reliable to prevent recovery of the numbers. Thus, even in the event of a tamper detection, cryptographic keys or other sensitive information may be compromised by malicious actors. As such, there may be a need for an MRAM device that can generate and/or store random numbers and that may be configured such that recovery of the contents of the MRAM device, as well as a cryptographic key generation mechanism, is rendered impossible (or more difficult compared to conventional techniques) in the event of tamper detection.

The present disclosure relates to memory devices (e.g., storage devices including MRAMs) and methods for generating information, storing the information in the memory device, and/or destroying the information in the event of tamper detection. For example, certain embodiments described herein may provide an MRAM device that may be used to generate and/or store one or more cryptographic keys. In some embodiments, in the event of tamper detection, the contents of the memory device as well as the cryptographic key generation mechanism may be reliably destroyed such that no recovery is possible (or is difficult). The scope of the current disclosure, however, is defined by the attached claims, and not by any characteristics of the resulting devices or methods.

BRIEF DESCRIPTION OF THE DRAWINGS

In the course of the detailed description that follows, reference will be made to the appended drawings. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein; however, all permutations and combinations are considered to fall within the scope of the present inventions.

Figure 1:
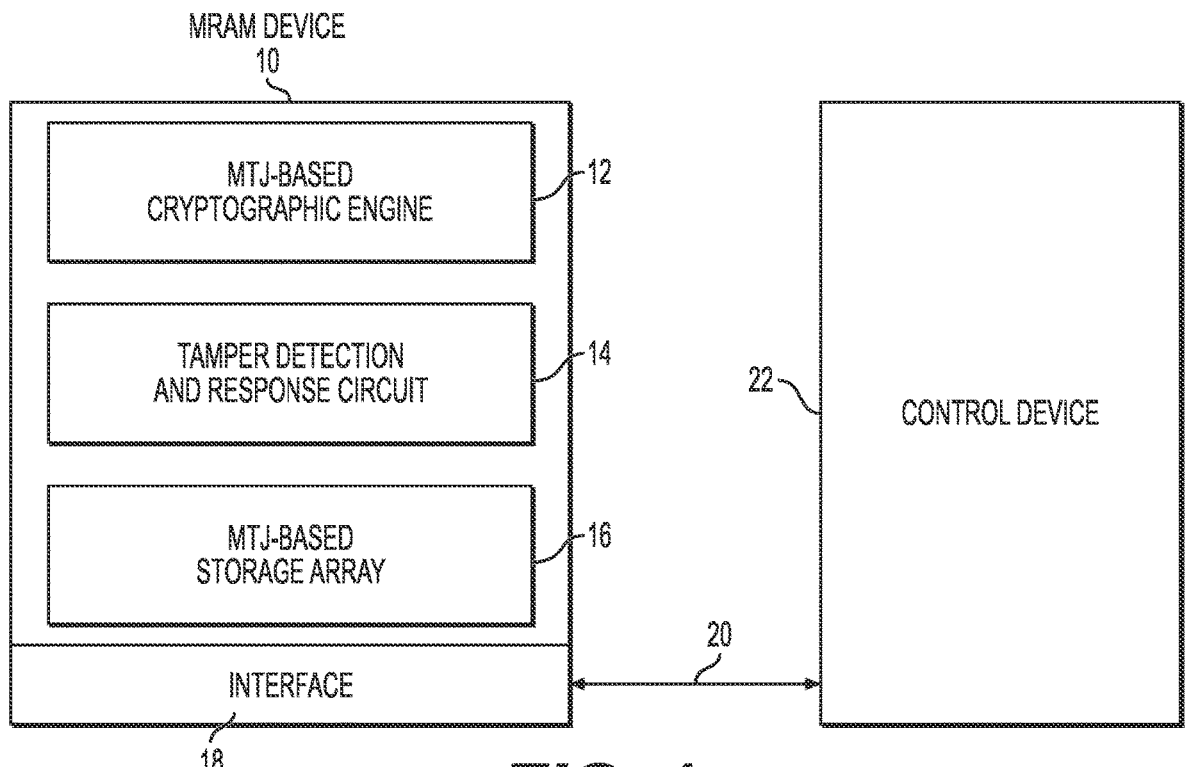
FIG. 1 depicts an exemplary MRAM device using magnetic tunnel junctions (MTJs) to store cryptographic keys or any data used to generate cryptographic keys, according to an aspect of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

DETAILED DESCRIPTION

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

In one aspect, the present disclosure is directed to techniques and implementations for storing and/or destroying information, such as cryptographic keys, in memory devices, including, e.g., non-volatile or "permanent" memory capable of maintaining data when a power supply is deactivated (e.g., magnetic memories or magnetic random access memories or MRAMs). Though the description below makes reference to magnetoresistive memory devices (e.g., MRAMs), the inventions may be implemented in other memory devices including, but not limited to, EEPROM, FRAM, PRAM, RRAM/ReRAM and/or Flash memory. In addition, although some embodiments are described with reference to cryptographic keys, certain embodiments described herein may be applicable to any random number or any other information generated by a computer and/or stored in memory.

With reference now to FIG. 1, there is depicted an exemplary MRAM device 10 using MTJs to store cryptographic keys or any data used to generate cryptographic keys, according to an aspect of the present disclosure. FIG. 1 illustrates an MRAM device 10 and a control device 22. The MRAM device 10 may include an MTJ-based cryptographic engine 12, a tamper detection and response circuit 14, an MTJ-based storage array 16, and an interface 18 (e.g., a communication interface). In some embodiments, the interface 18 may be a separate circuitry element from the MRAM device 10 (e.g., a separate circuitry element communicatively between the MRAM device 10 and the control device 22). The MRAM device 10 and the control device 22 may exchange communications 20 via the interface 18.

The MRAM device 10, the circuitry elements of the MRAM device 10, and the control device 22 may include circuitry configured to perform one or more operations described herein. The MRAM device 10 may include either Toggle MRAM or Spin Transfer Torque (STT) MRAM. The MTJ-based cryptographic engine 12 may include circuitry that performs MTJ-based computations, such as random number generation or a physically unclonable function. The MTJ-based cryptographic engine 12 included in the MRAM device 10 may utilize MTJs to generate a random number or key using random variation properties of the MTJs, as described in more detail elsewhere herein. For example, the random variation properties may include resistance variation, write voltage and/or write pulse width timing variations, and/or magnetoresistance (MR) variation. In some embodiments, the MTJ-based cryptographic engine 12 may perform the method illustrated in FIG. 4 and/or the method illustrated in FIG. 5.

The tamper detection and response circuit 14 may include circuitry configured to detect tampering with the MRAM device 10 or a circuitry element thereof and/or configured to perform an action to destroy information stored by the MRAM device 10. For example, the tamper detection and response circuit 14 may perform the method illustrated in FIG. 6.

The MTJ-based storage array 16 may include circuitry configured to store information, such as a cryptographic key, generated by the MTJ-based cryptographic engine 12. The MTJ-based storage array 16 included in the MRAM device 10 may be implemented using an array of MTJs coupled with a select device. The array of MTJs may be read using either mid-point referenced, self-referenced, or differential sensing methods. The array of MTJs may be written by applying a voltage (e.g., operating voltage (Vop)) sufficiently high to change the state of the MTJs. The size of the MTJ-based storage array 16 may be small (e.g., approximately $2^7$ bits, such as, for example, 128 bits), or may be large density (e.g., large enough to store approximately 64 megabits (Mbs) of data).

The interface 18 may include an interface circuitry block (e.g., parallel, serial peripheral interface (SPI), or dual data rate (DDR) standard interface), via which the MRAM device 10 may communicate with the control device 22. The control device 22 may include a microprocessor, microcontroller, system on a chip (SoC), and/or a field-programmable gate array (FPGA) that controls operations of the MRAM device 10, the MTJ-based cryptographic engine 12, the tamper detection and response circuit 14, and/or the MTJ-based storage array 16.

Figure 2:
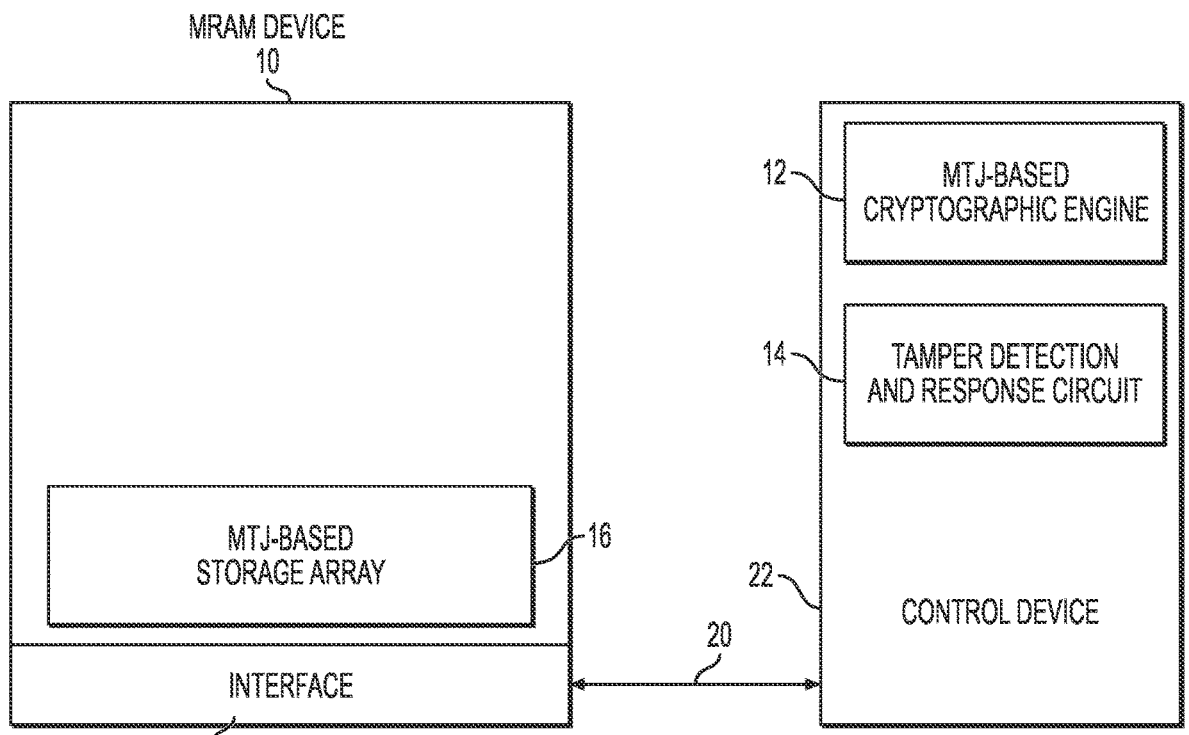
FIG. 2 depicts an exemplary MRAM device and a control device using MTJs, according to an aspect of the present disclosure.

FIG. 2 depicts an exemplary MRAM device 10 and a control device 22 using MTJs, according to an exemplary embodiment of the disclosure. The components illustrated in FIG. 2 are substantially the same as the components illustrated in FIG. 1, but arranged in a different manner compared to those illustrated in FIG. 1. For example, in FIG. 2, the MRAM device 10 includes the MTJ-based storage array 16, and the control device 22 includes the MTJ-based cryptographic engine 12 and the tamper detection and response circuit 14. In this example, if the tamper detection and response circuit 14 detects tampering, the tamper detection and response circuit 14 may destroy (or send commands to cause the destruction of) the MTJ-based cryptographic engine 12 and/or information stored in the MTJ-based storage array 16.

Figure 3:
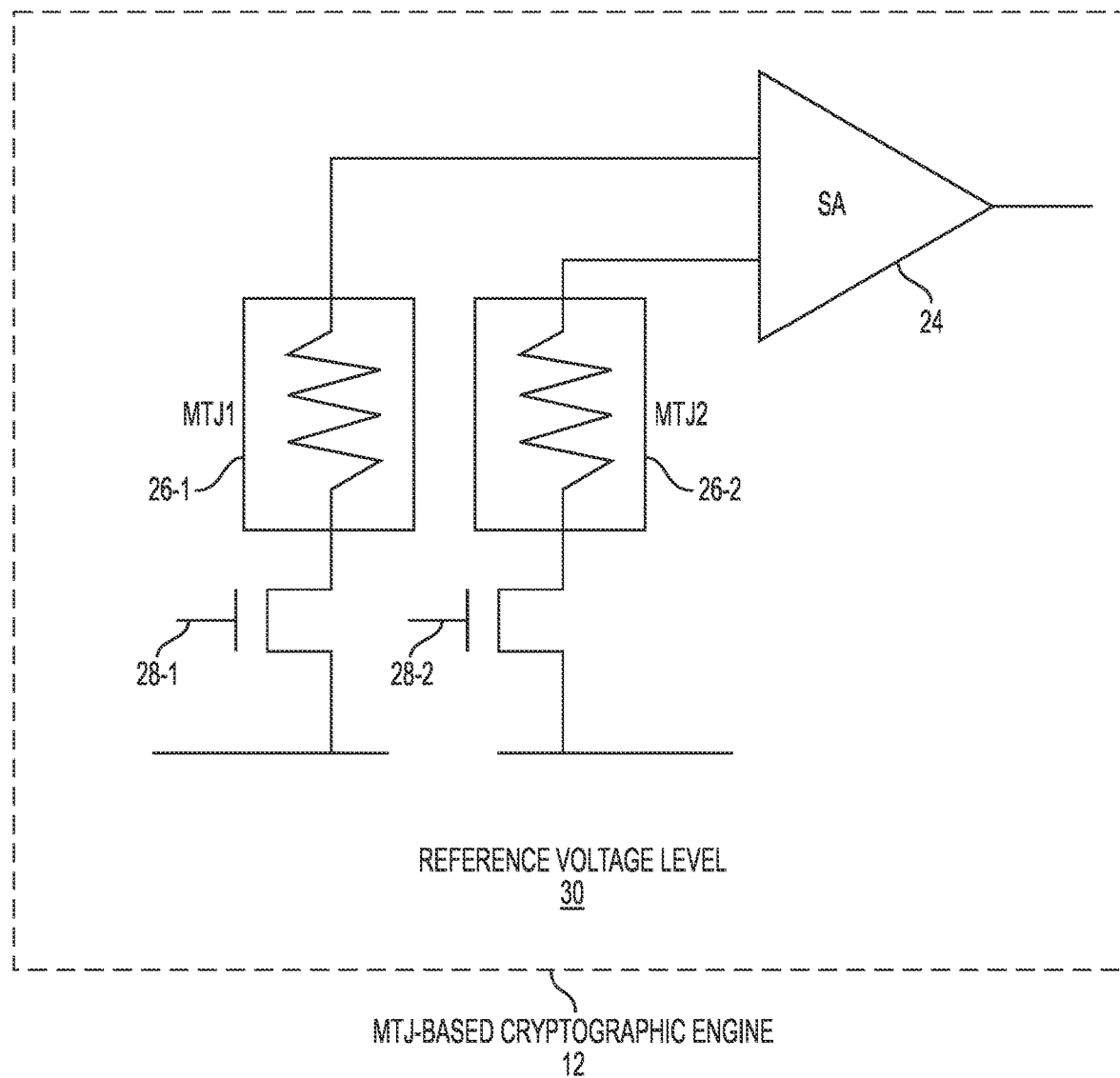
FIG. 3 depicts an exemplary circuit of an MTJ-based cryptographic engine, according to an aspect of the present disclosure.

FIG. 3 depicts an exemplary circuit of an MTJ-based cryptographic engine 12, according to an exemplary embodiment. As illustrated in FIG. 3, the MTJ-based cryptographic engine 12 may include a sense amplifier (SA) 24, two MTJs 26 (MTJ 26-1, labeled "MTJ1," and MTJ 26-2, "labeled MTJ2"), two transistors 28 (transistors 28-1 and 28-2), and a reference voltage level 30 (e.g., ground). Although the example illustrated in FIG. 3 includes a single SA 24, two MTJs 26, and two transistors 28, certain embodiments may include any number of these circuitry elements. Alternate circuit implementations may include one or more additional circuit elements, such as, for example, column selection switches, read and write bias control, additional MTJs, an MTJ connected to a different resistor, and/or the like.

The electrical outputs of the MTJs 26 may be electrically connected to corresponding inputs of the SA 24. In addition, the transistors 28 may correspond to, or may be electrically connected to, electrical inputs of the MTJs 26.

Figure 4:
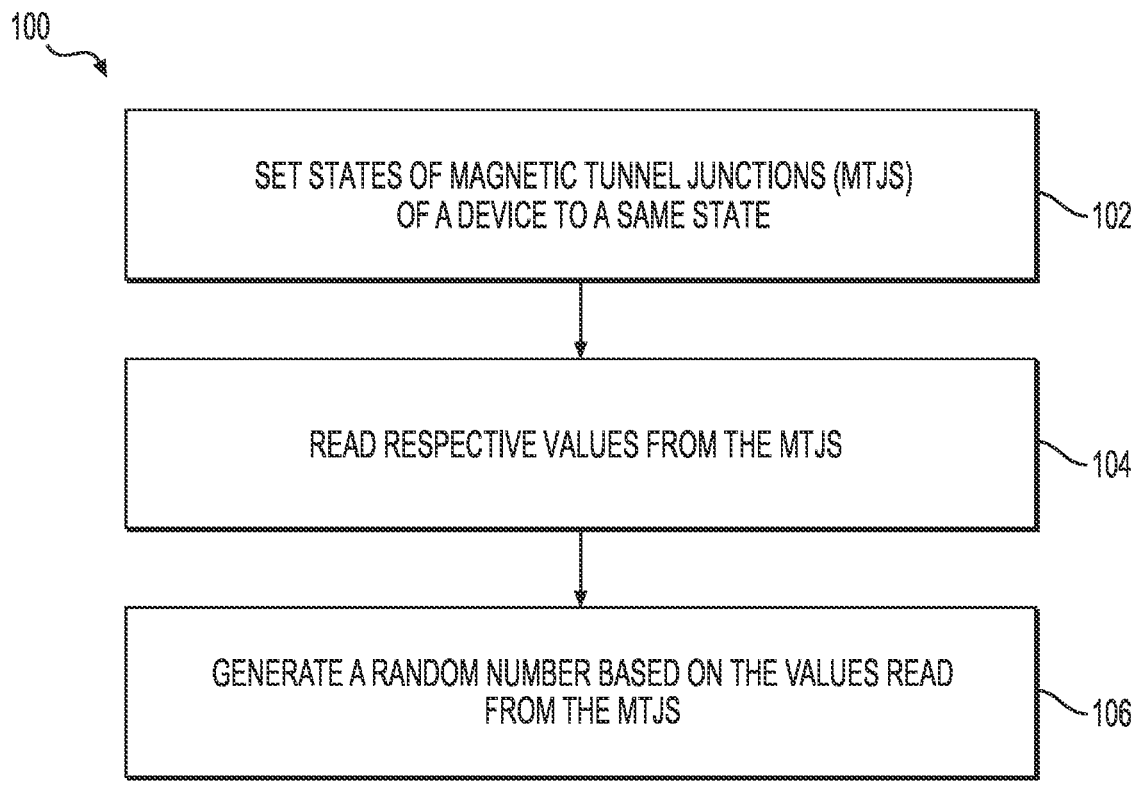
FIG. 4 depicts a flowchart for an exemplary method for generation of cryptographic keys using read variation for MTJs, according to an aspect of the present disclosure.

FIG. 4 depicts a flowchart for an exemplary method 100 for generation of cryptographic keys using read variation of the MTJs, according to an aspect of the present disclosure. In some embodiments, the MTJ-based cryptographic engine 12 may perform the steps of the method 100; however, in other embodiments, the control device 22 or other circuitry elements described herein may perform the method 100 (or certain steps thereof).

In step 102, the method 100 may include setting states of MTJs of a device to a same state. For example, the MTJ-based cryptographic engine 12 may set states of the MTJs 26 of the MTJ-based cryptographic engine 12 to a same state. As one specific example, with reference to FIG. 3, two MTJs 26 of the MTJ-based cryptographic engine 12 (e.g., MTJ1 and MTJ2) can be set such that both MTJs 26 are in a low resistance state or both MTJs 26 are in a high resistance state. In this example embodiment, MTJ resistance variation within the same state of the MTJs may be the variation element used to generate a random number for the cryptographic engine. In some embodiments, one MTJ 26 may be in a low resistance state and the other MTJ 26 may be in a high resistance state. Thus, MTJ MR variation, in addition to MTJ resistance, may be the variation elements used in this example embodiment.

In step 104, the method 100 may include reading respective values from the MTJs. For example, the MTJ-based cryptographic engine 12 may read values from the MTJs 26. Due to natural variations in the resistance, the SA 24 of the MTJ-based cryptographic engine 12 coupled to the MTJs 26 may read a different value from different manufacturing instances of MTJs 26. For example, different MTJs in a same die or MTJs from different dies may have different resistances and may provide different values when read, even though the MTJs are in the same state.

In step 106, the method 100 may include generating a random number based on the values read from the MTJs. For example, the MTJ-based cryptographic engine 12 may generate the random number (e.g., a cryptographic key) based on the values read from the MTJs 26 via the SA 24. The differences in the MTJs 26 described above may enable generating a random number or physically unclonable function. In some embodiments, the MTJ-based cryptographic engine 12 may store the random number in the MTJ-based storage array 16.

Figure 5:
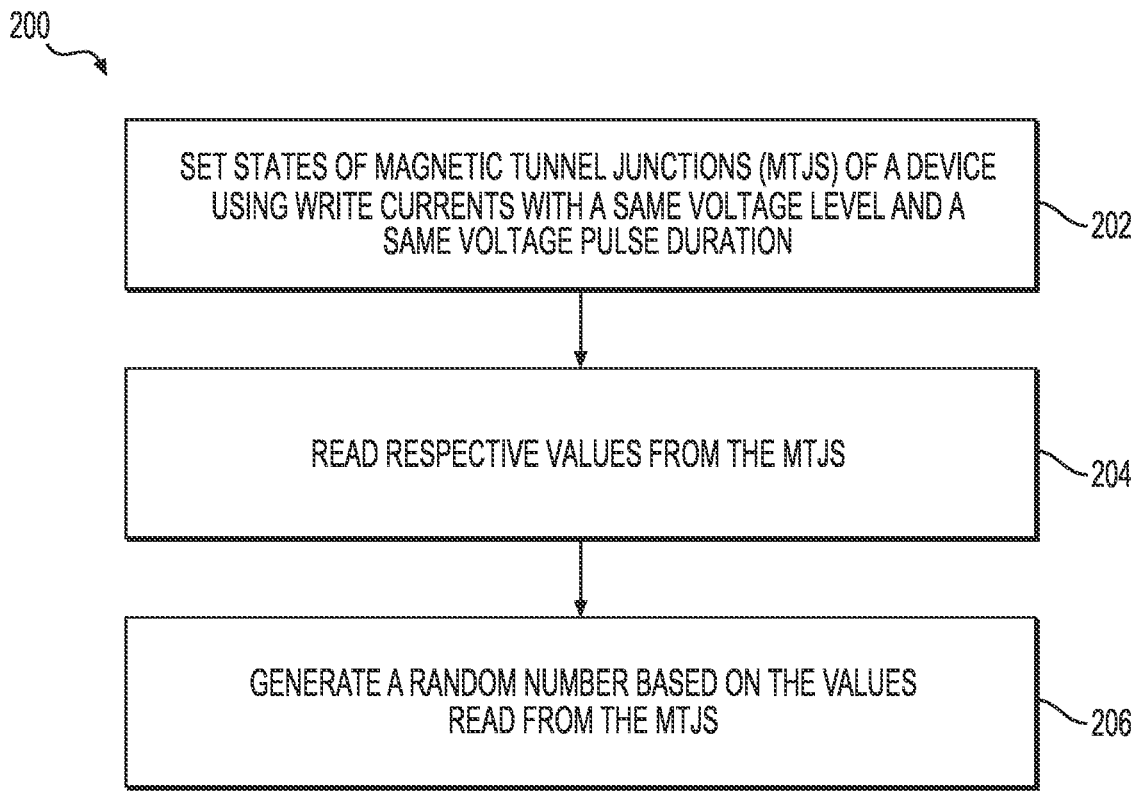
FIG. 5 depicts a flowchart for an exemplary method for generation of cryptographic keys using write variation for MTJs, according to an aspect of the present disclosure.

FIG. 5 depicts a flowchart for an exemplary method 200 for generation of cryptographic keys using write variation of MTJs, according to an aspect of the present disclosure. For example, the MTJ-based cryptographic engine 12 may perform the method 200 illustrated in FIG. 5; however, in other embodiments, the control device 22 or other circuitry elements described herein may perform the method 200 (or steps thereof).

In step 202, the method 200 may include setting states of MTJs of a device using write currents with a same voltage level and a same voltage pulse duration. For example, the MTJ-based cryptographic engine 12 may set states of the MTJs 26 of the MTJ-based cryptographic engine 12 using write currents with a same voltage level and a same voltage pulse duration. As a specific example, a write current with the same voltage level and voltage pulse duration may be applied to both MTJs 26. If the applied write voltage level and pulse width are set such that the MTJs 26 switch at close to 50% probability, the states of the MTJs 26 after the write current is applied may be random.

In step 204, the method 200 may include reading respective values from the MTJs. For example, the MTJ-based cryptographic engine 12 may read values from the MTJs 26 via the SA 24, and the values may vary based on the write variations described above. In step 206, the method 200 may include generating a random number based on the values read from the MTJs. For example, the MTJ-based cryptographic engine 12 may generate a random number based on the values read from the MTJs 26. In some embodiments, the MTJ-based cryptographic engine 12 may store the random number in the MTJ-based storage array 16.

Figure 6:
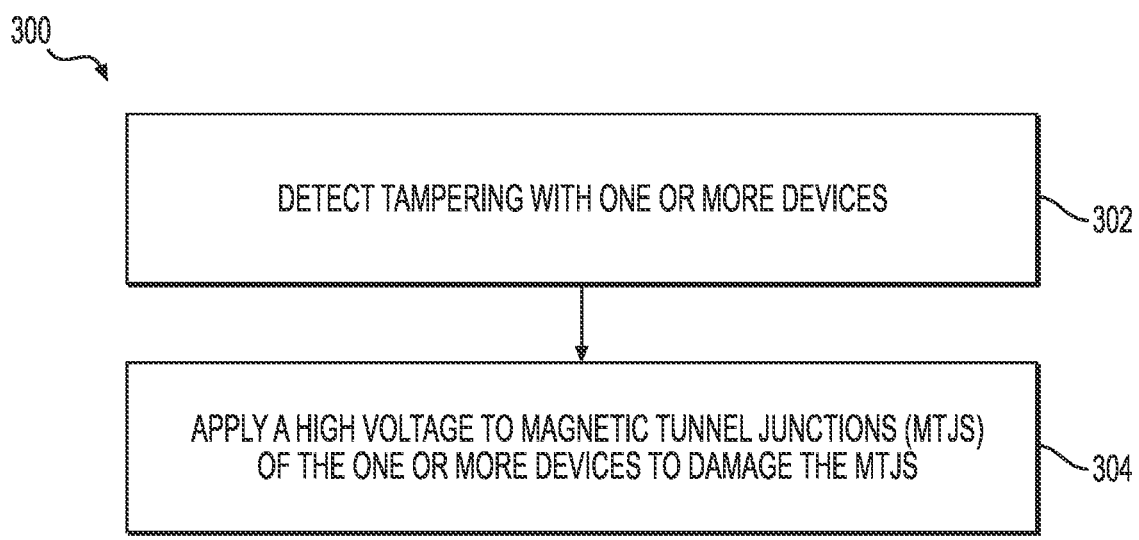
FIG. 6 depicts a flowchart for an exemplary method for tamper detection and cryptographic key destruction, according to an aspect of the present disclosure.

FIG. 6 depicts a flowchart for an exemplary method 300 for tamper detection and cryptographic key destruction, according to an aspect of the present disclosure. For example, the tamper detection and response circuit 14 may perform the method 300; however, in other embodiments, the control device 22 or other circuitry elements described herein may perform the method 300 (or steps thereof).

In step 302, the method 300 may include detecting tampering with one or more devices. For example, the tamper detection and response circuit 14 may detect tampering with one or more of the MRAM device 10, the MTJ-based cryptographic engine 12, the MTJ-based storage array 16, the control device 22, etc. The tamper detection and response circuit 14 may apply any tamper detection method, such as identifying an error correcting code (ECC) error threshold or referring to a pre-determined value in the MTJ-based storage array 16.

In the step 304, the method 300 may include applying a high voltage to MTJs of the one or more devices to damage the MTJs. For example, the tamper detection and response circuit 14 may apply a high voltage to the MTJs 26 of the MTJ-based cryptographic engine 12 and/or the MTJ-based storage array 16 to damage the MTJs 26. In certain embodiments, upon tamper detection, a sufficiently high voltage ($V_{breakdown}$, which may be greater than Vop) may be applied to the MTJs 26 in the MTJ-based storage array 16, the MTJ-based cryptographic engine 12, or both. The high voltage ($V_{breakdown}$), for example greater than 1 volt (V), may be applied long enough, for example greater than 100 nanoseconds (ns), to cause the MTJs 26 to short or become stuck at a low resistance state. The shorted MTJs 26 may not operate in a normal mode necessary for a functional MTJ-based storage array 16 or MTJ-based cryptographic engine 12. The shorted MTJs 26 may have low resistance, such as less than 500 Ohm ($\Omega$), lower than any one of the low or high states of the MTJs 26. Furthermore, the shorted MTJs 26 may not be written to change states with a write voltage or write pulse duration, thus deviating from normal mode operation.

In this way, certain embodiments may provide for permanent (or near permanent) destruction of MTJs in an MTJ-based cryptographic engine 12 and/or an MTJ-based storage array 16. This may improve security of a cryptographic key (or other information) or circuitry used to generate the cryptographic key in the event of tamper detection. In addition, a generated random number or physically unclonable function (PUF) can be used to generate a unique identifier or watermark for a device. The unique identifier can be used to identify secure devices. Furthermore, when the device is tampered, the unique identifier can be destroyed disabling the device or making it incompatible for functionality in a secure system.

In one embodiment, a storage device may comprise a magnetic tunnel junction (MTJ)-based storage array and a communication interface, wherein the MTJ-based storage array is configured to be damaged by a shorting voltage based on detection of a tamper event.

Various embodiments of the storage device may include: the storage device is electrically connected to a control device via the communication interface; the storage device further comprises: a magnetic tunnel junction (MTJ)-based cryptographic engine, and a tamper detection and response circuit; the control device comprises: a magnetic tunnel junction (MTJ)-based cryptographic engine, and a tamper detection and response circuit; the MTJ-based storage array is configured to be damaged by a shorting voltage from a tamper detection and response circuit; MTJs of the MTJ-based storage array are configured to be set to a same state and to provide respective values based on a configuration when the MTJs are read; MTJs of the MTJ-based storage array are configured to be set with same write currents and to provide respective values when the MTJs are read.

In another embodiment, a magnetic tunnel junction (MTJ)-based cryptographic engine may comprise: a sense amplifier; a plurality of MTJs, wherein electrical outputs of the plurality of MTJs are electrically connected to corresponding inputs of the sense amplifier; and a plurality of transistors, wherein the plurality of transistors correspond to electrical inputs of the plurality of MTJs, wherein the MTJ-based cryptographic engine is configured to use variations in the plurality of MTJs to generate a random number.

Various embodiments of the MTJ-based cryptographic engine may include: the MTJ-based cryptographic engine is included in a storage device that includes an MTJ-based storage array; the MTJ-based cryptographic engine is included in a control device electrically connected to a storage device that includes an MTJ-based storage array; the MTJ-based cryptographic engine is configured to be damaged by a shorting voltage based on detection of a tamper event; the MTJ-based cryptographic engine is configured to: set states of one or more MTJs of an MTJ-based storage array to a same state, read respective values from the one or more MTJs, and generate a random number based on the read values; the MTJ-based cryptographic engine is configured to: set states of one or more MTJs of an MTJ-based storage array using write currents with a same voltage level and a same voltage pulse duration, read respective values from the one or more MTJs, and generate a random number based on the read values.

In another embodiment, a method for damaging one or more magnetic tunnel junction (MTJ)-based devices may comprise: detecting, by a circuit, tampering with one or more devices, and applying a high voltage to one or more MTJs of the one or more MTJ-based devices to damage the one or more MTJs.

Various embodiments of the method may include: the one or more MTJ-based devices comprise an MTJ-based storage array or an MTJ-based cryptographic engine; the one or more devices comprise a storage device or a control device; the high voltage comprises a voltage configured to short the one or more MTJs; the circuit is included in a storage device or in a control device electrically connected to the storage device; the circuit comprises a tamper detection and response circuit; the detecting of the tampering further comprises: detecting the tampering using one or more tamper detection methods, the one or more tamper detection methods comprising: an error correcting code (ECC) error threshold, or reference to a pre-determined value.

The foregoing description of the inventions has been described for purposes of clarity and understanding. It is not intended to limit the inventions to the precise form disclosed. Various modifications may be possible within the scope and equivalence of the application.

We claim:

1. A storage device, comprising:
   a magnetic tunnel junction (MTJ)-based storage array, including an array of magnetic tunnel junctions (MTJs);
   a communication interface; and
   a magnetic tunnel junction (MTJ)-based cryptographic engine configured to generate a random number based on random variation properties of the MTJs in the MTJ-based storage array, the MTJ-based cryptographic engine including:
   a sense amplifier;
   one or more transistors; and
   at least two MTJs directly connected to the sense amplifier and the one or more transistors,
   wherein the MTJ-based storage array is configured to be damaged by receiving a voltage signal that causes a drop in a resistance of the MTJs in the MTJ-based storage array, in response to detection of a tamper event.

2. The storage device of claim 1, wherein the storage device is electrically connected to a control device via the communication interface.

3. The storage device of claim 2, wherein the storage device further comprises:
   a tamper detection and response circuit.

4. The storage device of claim 2, wherein the control device comprises:
   a tamper detection and response circuit.

5. The storage device of claim 1, wherein the MTJ-based storage array is configured to be damaged by a shorting voltage from a tamper detection and response circuit.

6. The storage device of claim 1, wherein the MTJs of the MTJ-based storage array are configured to be set to a same state and to provide respective values based on a configuration when the MTJs are read.

7. The storage device of claim 1, wherein the MTJs of the MTJ-based storage array are configured to be set with same write currents and to provide respective values when the MTJs are read.

8. A method for damaging one or more magnetic tunnel junction (MTJ)-based devices, the method comprising:
   detecting, by a circuit, tampering with one or more of a magnetic tunnel junction (MTJ)-based storage array or a magnetic tunnel junction (MTJ)-based cryptographic engine, wherein each of the MTJ-based storage array and the MTJ-based cryptographic engine includes a plurality of magnetic junction junctions (MTJs), and wherein the MTJ-based cryptographic engine is configured to generate a random number based on random variation properties of MTJs in the MTJ-based storage array; and
   applying a high voltage signal to damage one or more MTJs of the plurality of MTJs in the MTJ-based storage array or the MTJ-based cryptographic engine.

9. The method of claim 8, wherein the one or more devices comprise a storage device or a control device.

10. The method of claim 8, wherein the high voltage signal comprises a voltage configured to short the one or more MTJs.

11. The method of claim 8, wherein the circuit is included in a storage device or in a control device electrically connected to the storage device.

12. The method of claim 8, wherein the circuit comprises a tamper detection and response circuit.

13. The method of claim 8, wherein the detecting of the tampering further comprises:
   detecting the tampering using one or more tamper detection methods, the one or more tamper detection methods comprising:
      an error correcting code (ECC) error threshold, or
      reference to a pre-determined value.

14. The method of claim 8, wherein the applying the high voltage signal causes a drop in a resistance of the one or more MTJs of the plurality of MTJs in the MTJ-based storage array or the MTJ-based cryptographic engine.

\* \* \* \* \*